United States Patent [19]

Lynn

[11] Patent Number: 5,613,182
[45] Date of Patent: Mar. 18, 1997

[54] METHOD OF MANUFACTURING A POWDER METAL CONNECTING ROD WITH STRESS RISER CREASE FORMED IN THE SIDE FACE

[75] Inventor: Jean C. Lynn, Bloomfield Hills, Mich.

[73] Assignee: Chrysler Corporation, Auburn Hills, Mich.

[21] Appl. No.: 626,659

[22] Filed: Apr. 2, 1996

[51] Int. Cl.⁶ .................................................. B22F 3/24
[52] U.S. Cl. .............................................. 419/28; 419/38
[58] Field of Search ................................ 419/28, 38

[56] References Cited

U.S. PATENT DOCUMENTS

| Re. 32,117 | 4/1986 | Weaver | 225/103 |
|---|---|---|---|
| 1,630,759 | 5/1927 | Pierce | 29/156.5 |
| 2,553,935 | 5/1951 | Parks | 29/156.5 |
| 2,648,578 | 8/1953 | Stearns | 308/196 |
| 3,818,577 | 6/1974 | Bailey et al. | 29/413 |
| 3,864,809 | 2/1975 | Donachie | 29/420.5 |
| 3,889,350 | 6/1975 | Mocarski | 29/420.5 |
| 3,994,054 | 11/1976 | Cuddon-Flethcer | 29/156.5 A |
| 4,049,429 | 9/1977 | Donachie | 75/246 |
| 4,094,053 | 6/1978 | Weaver | 29/423 |
| 4,754,906 | 7/1988 | Brovold | 75/249 |
| 4,838,936 | 6/1989 | Akechi | 419/27 |
| 4,923,674 | 5/1990 | Weber | 29/888.092 |
| 4,993,134 | 2/1991 | Hoag et al. | 419/27 |
| 5,051,232 | 9/1991 | Summers | 29/888.09 |
| 5,208,979 | 5/1993 | Schmidt | 29/416 |
| 5,283,938 | 2/1994 | Jones . | |
| 5,460,776 | 9/1996 | Ackermann et al. | 419/44 |
| 5,516,483 | 5/1996 | Shivanath et al. | 419/14 |

FOREIGN PATENT DOCUMENTS

| 55-154505 | 12/1980 | Japan . |
|---|---|---|
| 58-141301 | 8/1983 | Japan . |
| 5277843 | 10/1993 | Japan . |

OTHER PUBLICATIONS

"Powder Metallurgy Design Manual"; Metal Powder Industries Federation.

"Powder Forged Connection Rods", Federal Mogul; pamphlet.

"Powder Metallurgy Design Solutions"; Metal Powder Industries Federation; Copyright 1993; Princeton, NJ.

*Primary Examiner*—Charles T. Jordan
*Assistant Examiner*—Daniel Jenkins
*Attorney, Agent, or Firm*—Kenneth H. MacLean

[57] ABSTRACT

This invention relates to a method of manufacturing a connecting rod of powder metal and having a stress riser crease formed on a side thrust face of the rod formed by hot forging a sintered powder metal preform which has a generally V-shaped notch molded in a side surface whereby the hot forging folds the spaced surfaces of the notch towards one another in non-bonding close relation to form a deep, almost widthless crease.

3 Claims, 2 Drawing Sheets

METHOD OF MANUFACTURING A POWDER METAL CONNECTING ROD WITH STRESS RISER CREASE FORMED IN THE SIDE FACE

TECHNICAL FIELD

The invention concerns an improved manufacturing method of a powder metal connecting rod with a stress riser crease formed in a side face by forging a sintered preform with a generally V-shaped notch in the side face. A one-piece forged rod is produced having a crease therein which is readily separated by a cracking process into a two-piece rod with a separable bearing cap.

The manufacturing process involves pressure molding metal particles in a closed mold under significant pressure to produce a green compact form of the rod. The mold has a configuration to form a generally V-shaped notch in situ on a side thrust face of the green compact. Next, the green compact is heated in a furnace sufficiently to form a sintered preform in which metal particles are bonded. Next, the sintered preform is hot forged to final rod shape which increases the rod's density and strength. During the hot forging, spaced surfaces forming the V-shaped notch are folded inwardly toward one another to create a deep crease of practically no width which serves as a very effective stress riser. Then the rod is cracked by applying a tension force, the crease effectively concentrates stress to readily start a fracture of the rod at the bottom of the crease which fracture progresses through the rod.

BACKGROUND OF THE INVENTION

It is known in the engine connecting rod art to produce a two-piece engine connecting rod having a main body portion and a separable bearing cap portion from a one-piece unitary rod. A typical rod has an apertured large end portion from which the bearing cap is formed to allow the large end portion of the rod to be installed about the crankshaft's journal. A relatively old method for separating a bearing cap from a unitary rod is to actually saw the large end of the rod apart.

A more recent and preferred means of separating a bearing cap from a one-piece rod is by cracking or fracturing the rod. This method utilizes a longitudinally applied tension force of relatively great magnitude. The tension force causes the rod to crack and completely fracture. To control the cracking location and insure its position across the apertured large end portion of the rod, a stress riser is formed on the rod to accurately locate where the crack starts and to orient a desired fracture plane.

Stress risers are typically made in the form of a notch, groove, or scribe. Conventionally, stress riser notches have been broached or formed by a like mechanical cutting operation. Of course, as a broaching tool wears, the stresses riser notch becomes less distinct with rounded edges. This reduces its effectiveness and increases the tension force necessary to crack the rod. However, even using a sharp broaching tool, the V-shaped notch is too wide and shallow.

A recently discovered method to produce a desirable stress riser notch is to use a laser energy source to cut a narrow groove. This procedure is currently being practiced by Chrysler Corporation. The resultant laser formed stress riser is narrower and deeper than one formed by broaching. However, the laser operation is relatively complex and requires attention to achieve consistent results.

A preferred method of forming a stress riser in a rod is applicable only to connecting rods made from sintered powder metal such as steel particles. First, a green compact form of the rod is made by molding powder metal in a closed mold under significant pressure to mechanically interlock metal particles together. The green compact is sufficiently stable for handling but is not strong enough to be used as a rod. The mold also includes a configuration which forms a generally V-shaped notch in a side face of the green compact. Next, the green compact is heated in a furnace to about 2000 degrees F. and maintained at that temperature for a sufficient period of time to bond or sinter the metal particles into a strong, unitary structure. The resultant sintered preform or blank is much stronger than the green compact but still does not have sufficient strength and density for use as a connecting rod.

Then, the sintered blank is hot forged to increase density and strength. During hot forging, the thickness of the sintered blank is decreased and the spaced surfaces which form the V-shaped notch are folded inwardly toward one another to form a deep slit or crease with no substantial width.

Stress risers has been used to control rod cracking or fracture. Conventionally, stress risers have been located along the cylindrical surface of the aperture which extends through the large end portion of the rod. When a tension force is imposed on the rod, it is intended that the crack start evenly along the length of the stress riser and that the fracture progress straight across the rod. It has been found that when a stress riser is located in the above described cylindrical surface of the aperture, the maximum stress develops at one end of the stress riser adjacent the side thrust face and not evenly along the length of the stress riser. Resultantly, a small but significant percentage of such cracked rods have been found to include a small third piece of metal between the bearing cap portion and the main body of the rod. The formation of this third piece is unacceptable since it may interfere with accurate remating of the bearing cap with the main body. Such rods are scraped.

In accord with the above background of the manufacture of powdered metal connecting rods, the following are known: U.S. Pat. Nos. 32,117 to Weaver; 5,283,938 to Jones; 5,208,979 to Schmidt; 5,051,232 to Summers; 4,993,134 to Hoag et al.; 4,923,674 to Weber; 4,860,419 to Hekman; 4,838,936 to Akechi; 4,094,053 to Weaver; 4,049,429 to Donachie; 3,994,054 to Cuddon-Fletcher; 3,818,577 to Bailey et al.; 3,889,350 to Mocarski; 3,864,809 to Donachie; 2,648,578 to Stearns. The following foreign references are known: Japanese 58-141301; Japanese 55-15405; Japanese 5-277843;

SUMMARY OF THE INVENTION

This application concerns an improved manufacturing method of an easily cracked and fractured powder metal connecting rod with a crease-like stress riser in a side thrust face. The manufacturing steps are: molding a green compact form of the rod from metal particles in a closed mold under significant pressure; forming a V-shaped notch in a side face of the green compact; heating the green compact sufficiently to bond the metal particles together to form a sintered preform; forging the sintered preform to increase density and strength while at the same time folding spaced surfaces of the V-shaped notch inwardly toward one another to create a deep crease of no practical width in the side face; applying a tension force on the rod in a longitudinal direction to generate a stress at the crease causing the rod to crack and fracture thus separating a bearing cap.

The finished two-piece connecting rod consists of a body and a bearing cap portion made by cracking a hot forged one-piece rod blank. The hot forging is carried-out on a sintered preform. The sintered preform itself is formed from heating a green compact form of the rod until the metal particles are bonded or sintered. The green compact is formed in a closed mold in which metal particles are subjected to great pressure. The green compact produces a stable part with metal particles tightly packed together and mechanically interlocked and which can be handled. Portions of the mold creates a generally V-shaped notch in one side surface of the green compact which is retained in the sintered preform. Hot forging the sintered preform into a final rod configuration increases its density and strength and also folds spaced surfaces of the V-shaped notch toward one another to create a deep and very narrow crease which forms a very effective stress riser.

Applicant has discovered that by cracking a rod using a tension force a maximum stress is generated along the side thrust face of the rod lying adjacent the apparatus which creates the tensioning. Accordingly, applicant locates stress risers along the side thrust face of the rod rather than along the cylindrical surface of the rod's aperture as is the conventional location. This consistently produces superior cracking of rods. The new location of the stress riser combined with the improved process to make the forged rod with its deep crease results in: decreased tension forces necessary to crack a rod; consistent formation of substantially flat and co-planar fracture surfaces; and substantial elimination of the formation of undesirable third pieces.

Therefore, an object of the invention is to provide an improved manufacturing method of a connecting rod by making a green compact having a molded notch in a side face and then by heating the green compact to make a sintered preform, and then by hot forging the sintered preform to form a forged rod, and then cracking the forged rod to separate a bearing cap portion from the remainder of the rod. The resultant fracture planes are substantially flat and co-planar formed on either side of the rod aperture and without forming undesirable third pieces.

A further object of the invention is to provide an improved method of manufacturing a connecting rod with crease-like stress risers along a side thrust face by hot forging a sintered powder metal preform having a V-shaped notch in its side face, whereby the crease is characterized by substantial depth and no practical width. This crease effectively permits the rod to be readily cracked starting at the bottom of the crease and with the cracks progressing across the rod to form substantially flat and co-planar fracture surfaces without creation of any undesirable third piece.

Other objects and advantages of the invention will be apparent to one skilled in the engine and connecting rod art.

DESCRIPTION OF EMBODIMENT SHOWN IN THE DRAWINGS

The Improved Hot Forged Connecting Rod

Figure 1:
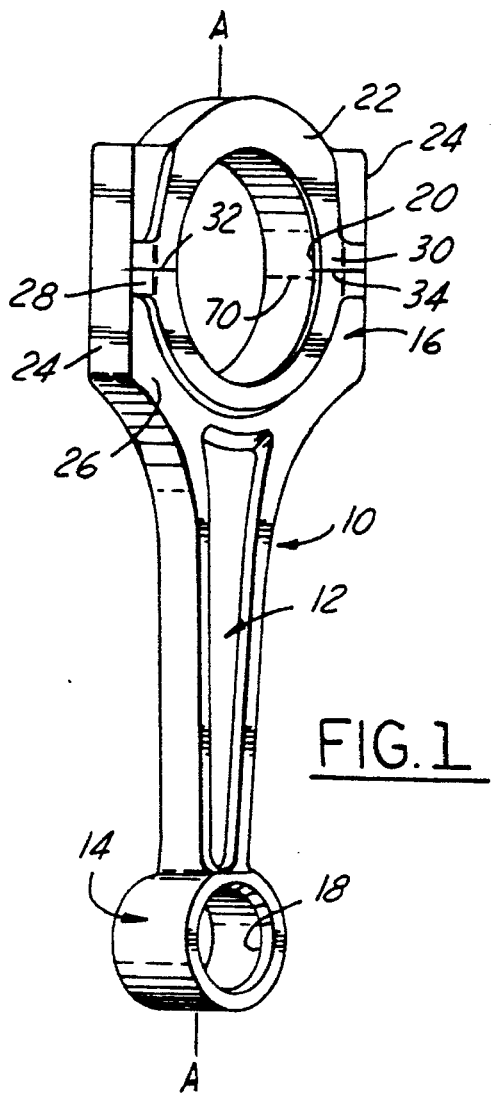
FIG. 1 is a perspective view of the one-piece connecting rod showing a forged-in crease in a thrust face side surface prior to cracking.

In FIG. 1, a one-piece connecting rod 10 is illustrated prior to being cracked into a two-piece rod with a separable bearing cap portion. The rod 10 has an elongated configuration extending along longitudinal axis A—A. Visible in FIG. 1 are: a midportion 12; a small end portion 14; and a large end portion 16. A bore 18 is formed through the small end portion 14 adapted to receive a wrist or piston pin (not shown) as is well known in the engine art. An aperture 20 is formed through the large diameter end 16 and is adapted to receive a journal of a crankshaft (not shown) as is well known in the engine art. The large end portion 16 has a side thrust face 22. An opposite side thrust face 22" is visible in FIG. 8. The rod's large end portion 16 has a pair of oppositely facing edges or end surfaces 24. In the particular design of the connecting rod shown in FIG. 1, the side thrust face 22 is in a raised plane with respect to the remaining side surface 26. Side thrust face 22 also includes a pair of radially outwardly extending portions 28, 30 located to either side of aperture 20. Portions 28, 30 extend radially outward from aperture 20 and terminate at end edges 24.

As shown in FIG. 1, a pair of slits or creases 32, 34 are formed in the side thrust face including extensions 28, 30. Each crease 32, 34 is arranged to one side of aperture 20 and they are substantially aligned across aperture 20. Creases 32, 34 extend inwardly from surfaces 28, 30 to a considerable depth as is evident by examination of the leftward end 24 and the cylindrical surface which forms the bore 20.

Making The Green Compact and sintered Preform

Figure 2:
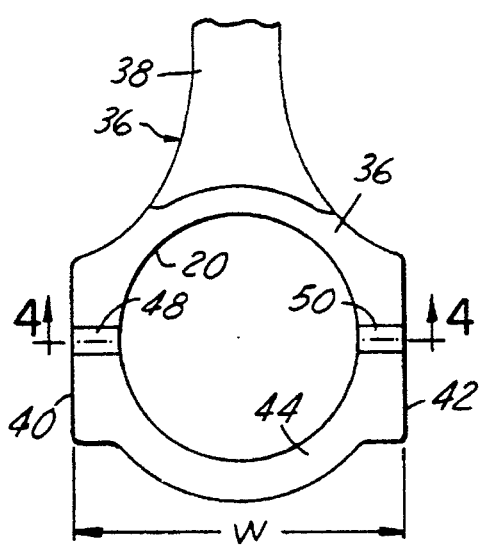
FIG. 2 is an elevational front view of the large end portion of a sintered preform or blank form of the rod.
Figure 3:
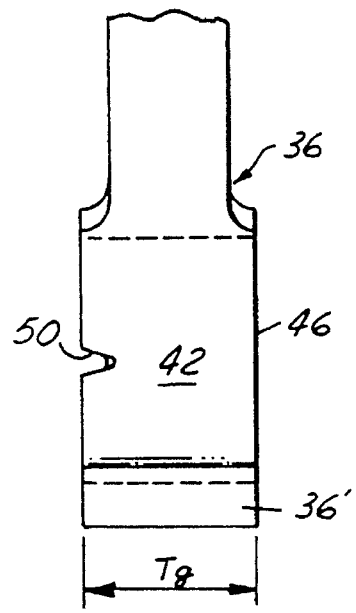
FIG. 3 is an elevational side view of the large end portion of the rod blank shown in FIG. 2.
Figure 4:
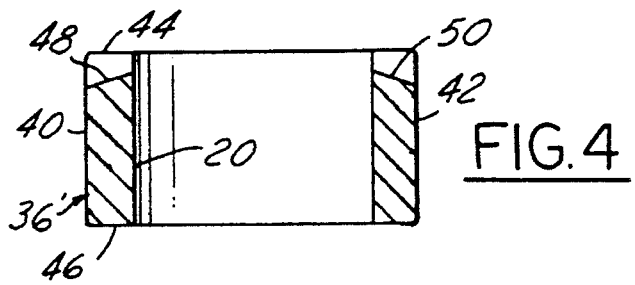
FIG. 4 is a sectioned view taken along section line 4—4 in FIG. 2 and looking in the direction of the arrows.

FIG. 2–4 illustrate the enlarged end portion 36' of the green compact and sintered preform configuration 36. A portion of its midportion 38 is also seen. Basically, a green compact is the form of the rod produced by molding steel powder metal particles in a closed mold under great pressure, typically about 80,000 psi. This pressure molding causes the particles to mechanically interlock and form a stable, relatively weak part but strong enough for handling. Next, the green compact is heated in a furnace at about 2000 degrees F. for a period of time sufficient to sinter or cause metal particles to bond thereby producing the sintered preform or blank form of the rod. The preform has the same configuration as the green compact but is much stronger of course. For some applications, a sintered preform or blank has sufficient strength for use without further processing. However, a connecting rod requires great strength and so the sintered preform must be further treated as discussed later.

During pressure molding of the green compact, its length and width W are molded to the actual desired width and length of the rod shown in FIG. 1. Because the green compact and sintered preform will be further processed to increase strength and density, its thickness Tg ("g" referring to the green compact form) is significantly greater than the respective thickness of the final rod shown in FIG. 1. Also, the midportion 38 and small end portion are also thicker that in the final rod 10.

As seen in FIG. 2–4, the molded green compact has the following general features: a large end portion with an aperture 20; edge surfaces or ends 40, 42; and side surfaces or faces 44, 46. Also, a pair of generally V-shaped notches 48, 50 are mold formed in situ in the side face 44, one on either side of aperture 20. Now looking to FIG. 3, the V-shaped configuration of the notch 50 is best shown. Also, the depth of the notch is about one fifth of the thickness Tg.

Looking to FIG. 4, further details of the notch are apparent. Specifically, a variable depth configuration is shown in which the notch depth is least adjacent the aperture and increases outwardly to the end surface or edge. The value of providing a variable depth notch will be more easily understood from the discussion of the hot forging step set out later in this application. The object is to finish with a stress riser which has a generally constant depth as measured from the side thrust face.

Hot Forging the Sintered Preform

Figure 5:
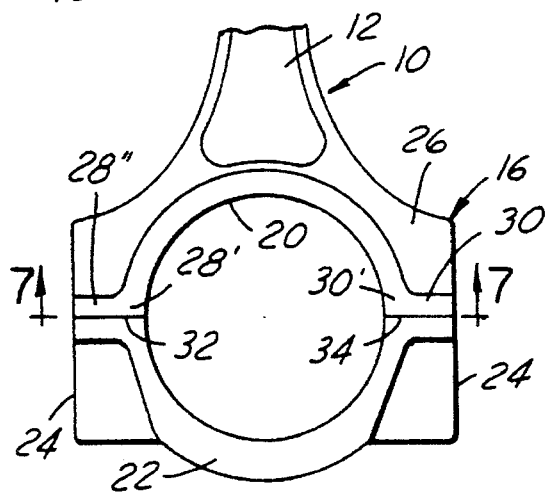
FIG. 5 is an elevational front view of the large end portion of a hot forged form of the rod showing the stress riser crease prior to cracking.
Figure 6:
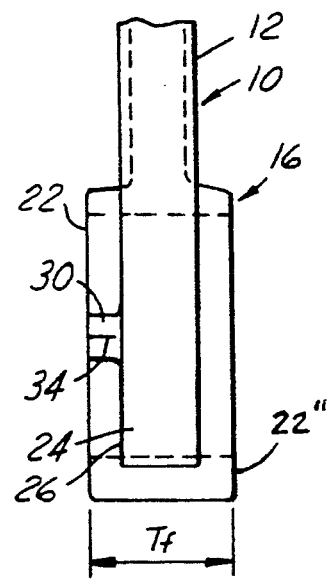
FIG. 6 is an elevational side view of the large end portion shown in FIG. 5.
Figure 7:
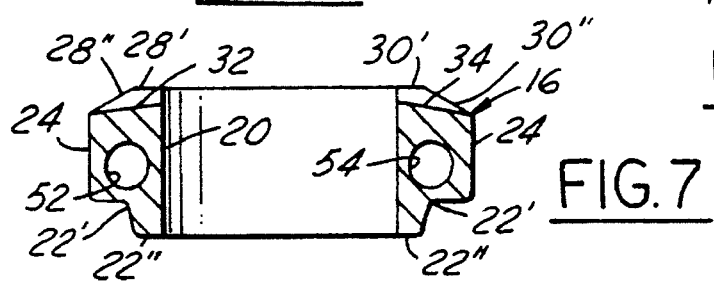
FIG. 7 is a sectioned view taken along section line 7—7 in FIG. 5 and looking in the direction of the arrows.

The sintered preform is hot forged to increase density and strength as required for a connecting rod. Typically, it is hot forged in a press at a pressure of about 60,000 psi and at a temperature of about 1800 degrees F. In addition to the view of the rod's final configuration in FIG. 1, further details are revealed in FIG. 5–7. When the forged rod shown in FIG. 5–7 is compared to the sintered preform 36 shown in FIG. 2–4, the changes in the configuration of the rod are apparent. The depth or thickness of the forged rod have been significantly decreases by the hot forging operation. Note that the thickness Tf ("f" for forged) is only about 80% of thickness Tg of the sintered blank or green compact. Also, note in FIG. 7 that the hot forging has formed an indented surface portion 22' inwardly from the one side face or surface 22".

Referring to FIG. 7, the hot forging has altered the configuration of the upper side face or surface of the rod. The face now includes a new surface configuration including a radially inwardly located flat portions 28', 30' which are in a plane normal to the axis A—A. Also created are radially outwardly located angled or inclined surface portions 28", 30".

Hot forging also alters the spaced surfaces forming notches 48, 50 in the sintered preform. These surfaces are moved or folded inwardly toward one another to form creases 32, 34. The creases have considerable depth but no substantial width. The closing of the notch surfaces do not result in bonding or sintering of one to the other as the temperatures are lower that the furnaces 2000 degrees F. Also, an agent or means is used to prevent bonding.

Referring now back to FIG. 4, the formation of the notches 48, 50 in the green compact and sintered preform are shown. These notches have a variable depth so that the depth is least adjacent the aperture 20 and greater toward edge surfaces 40, 42. The creases 32, 34 which are formed from the notches by hot forging have a relatively consistent depth as measured from surfaces 28', 28" and from surfaces 30', 30". With a rod having a non-planar side surface as seen in FIG. 7. The use of a variable depth notch in the green compact and sintered preform is needed to produce consistent depth creases. In other words, without the variable depth notch a rod with inclined surfaces like 28" and 30" would then have a shallower crease adjacent the outer edges 24. Or at the worst, the crease might not extend all the way from the aperture 20 to the edge 24.

Also as seen in FIG. 7, after formation of the rod 10 by hot forging and before cracking the rod, a pair of bores 52 and 54 are made in the large end. The portion of the bores 52, 54 extending in the subsequent body portion of the rod are threaded to receive threads of cap screws (not shown) as is well known in the engine art. After the bearing cap is formed by cracking the rod, the cap screws resecure the bearing to the body of the rod.

Method of Cracking the Rod

Figure 8:
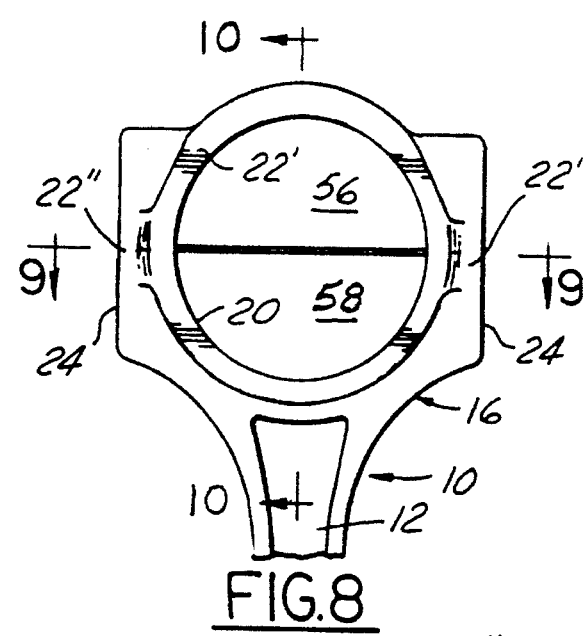
FIG. 8 is an elevational side view of the large end portion of a one-piece forged rod mounted about a split cylinder formed by separable mandrels and prior to cracking.
Figure 9:
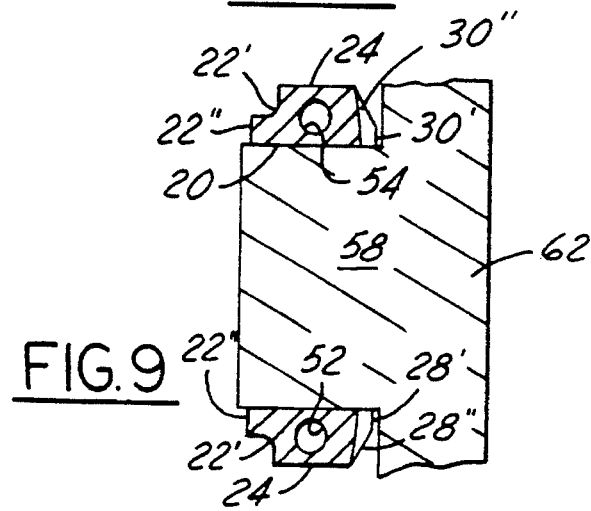
FIG. 9 is a sectioned view taken along section line 9—9 in FIG. 8 and looking in the direction of the arrows.
Figure 10:
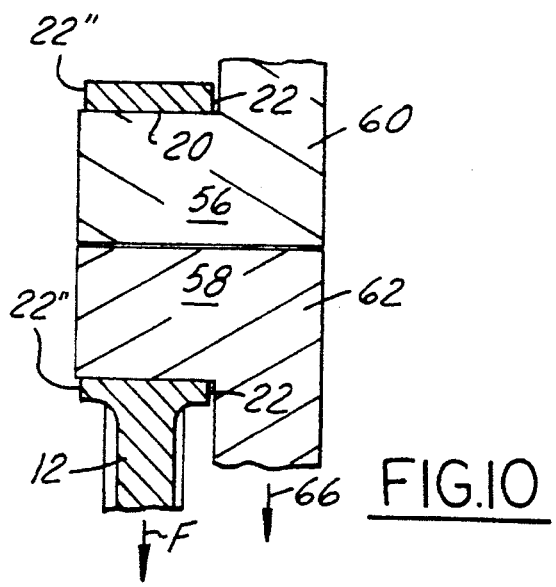
FIG. 10 is a sectioned view taken along section line 10—10 in FIG. 8 and looking in the direction of the arrows.

An apparatus in somewhat simplified form for applying tension forces across the large end portion of the rod is shown in FIG. 8–11. When the tension force is great enough, the one-piece rod 10 is fractured to form the typical two-piece rod consisting of a body and a bearing cap. In FIG. 8, aperture 20 in the large end portion 16 of the hot forged rod 10 is shown. The aperture encircles a two-part, split mandrel defined by two semi-cylindrical parts 56 and 58. Referring now to FIG. 10, the semi-cylindrical parts 56, 58 are operably connected respectively to support structures 60, 62. Parts 56, 58, are sized to form a cylinder slightly smaller than aperture 20 to ease mounting of the rod end about parts 56, 58. After the rod is located about parts 56, 58, a mechanism separates parts 56, 58 slightly under a relatively light force. This takes up looseness and therefore rigidly secure the rod to the tensioning device.

In FIG. 10, the support structures 60, 62 are integrally attached to parts 56, 58, respectively. The upper part 60 is fixed and the lower part 62 is operatively connected to a hydraulic force producing mechanism to impose a relatively great force 66 on the part 62 which tends to move it downward away from part 60. This creates a tension force across the creased portion of the rod and eventually causes the rod to crack and fracture. After the rod is fractured, the parts 58, 62 move slightly downward and then back upward toward the original position. The slight gap shown in FIG. 11 between cylindrical surface 20 and surface 68 of part 58 shows that the rod has been cracked and fractured.

As previously mentioned, the conventional position of the stress riser is along the circumferential surface which defines aperture 20. This position is shown in FIG. 1 by broken line 70. As explained, this location of the stress riser will occasionally produce inconsistent results. It has found that a tension force applied across the large end portion of the rod 10 creates a maximum stress level along the side thrust face 22 of the rod or specifically at surfaces 28', 28' and surfaces 30', 30'. The maximum stress is not created along the cylindrical surface. In this application, the stress riser creases 32, 34 are located in the side thrust face 22 adjacent to the tensioning structures 60, 62 where a maximum stress is created. Resultantly, the consistency of the cracking results are improved.

Figure 11:
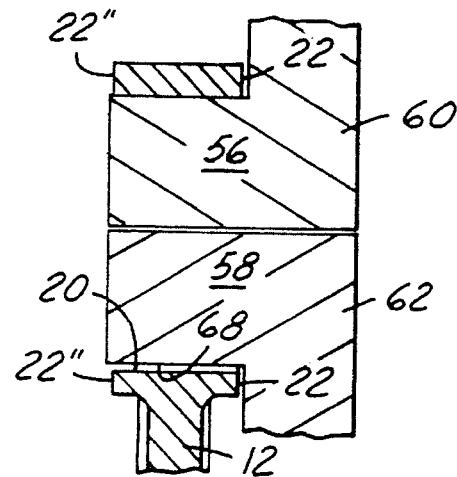
FIG. 11 is a sectioned view similar to the view of FIG. 10 but of a cracked rod.

In FIG. 11, a tension force sufficient to crack the rod has been applied. The crack starts at the bottom of creases 32 and 34 in side thrust face 22 and progresses toward the opposite side thrust face 22'. Evidence that the rod has been cracked is visible in FIG. 11 by the space between surface 68 and 20.

Summary of Method Steps

In its simplest application, the connecting rod is made by pressure molding powder metal, preferably steel, in a closed mold. The pressure molding causes the metal particles to be mechanically interlocked resulting in a generally stable but weak part called a green compact. Also, the mold has a configuration to create a V-shaped notch in situ in the rod's side thrust face. Next, the green compact is heated sufficiently to bind or sinter metal particles together. This produces a sintered blank or preform which is rigid and quite strong. The green compact and the sintered preform has a length and width very close to the length and width of the resultant connecting rod. However, the thickness of either is produced at about 25% greater dimension than the final rod.

Next, the sintered preform is hot forged to increase its density and strength. The preform's thickness is reduced to about 80% of the preform's thickness. Also, the hot forging causes the spaced surfaces of the V-shaped notch to be folded toward one another (but not fused together). This forms a deep crease on no substantial width. The crease is very effective for generating a cracking of the rod. It has been found that cracking can be carried out with much less tension and the fracture results are far better and more consistent by positioning the crease in the side thrust face or surface and with the rod positioned on the tensioning machine so that the crease lies closest to the mechanism. It is observed that the stress on the rod is greatest along this side thrust surface adjacent the tensioning device. With this arrangement, the crack occurs readily starting at the bottom of the crease and progressing rapidly and consistently across the thickness of the rod. With this improved process, undesirable creation of a third piece is effectively prohibited.

When necessary, a variable depth V-shaped notch can be formed in the green compact. In the connecting rod described in this application and as best shown in FIG. 5-7, the side thrust face 22 forms square surfaces 28', 30' and angled or inclined outer surfaces 28" and 30". It is found that with such a configuration, the depth of the creases 32, 34 should be slightly angled or inclined as is the corresponding surface. This inclination is accomplished by forming a significantly variable depth notch, best shown in FIG. 2-4. Note that the bottoms 48, 50 of the notches to either side of aperture 20 is angled with respect to a plane normal to the axis of aperture 20. The notch gets deeper radially outward from aperture 20. To accomplish this, the mold forming the green compact is simply configured to create this variable depth notch configuration.

Although only one embodiment of the various forms of the rod, namely a green compact, a sintered preform, and a forged rod have been illustrated and described in detail and only one apparatus to tension and crack the rod has been illustrated and described in detail, it is contemplated modifications to these are contemplated which would still fall within the scope of the invention as defined by the following claims.

I claim:

1. A method for manufacturing a readily cracked connecting rod from powder metal, comprising the following steps:

pressure molding powder metal into a green compact form utilizing a mold configuration creating a generally V-shaped notch in a side thrust face of the green compact; heating the green compact sufficiently to bond the metal particles together forming a sintered preform; forging the sintered preform to form a one-piece rod characterized by great density and strength while simultaneously folding the spaced, notch defining surfaces inward toward one another to produce a stress riser crease in the side thrust face of the rod; positioning the rod so that the creases lie adjacent crack inducing force apparatus, whereby the maximum stress imparted to the rod blank by the crack inducing apparatus is applied along the crease.

2. A method for manufacturing a readily cracked connecting rod from powder metal, comprising the following steps:

providing a closed mold for a green compact form of the rod to create a desirable rod length and width configuration but with a depth configuration greater than the desired rod and with a configuration to form a generally V-shaped notch in a side face of the green compact; pressure molding a green compact characterized by mechanical interlocking of metal particles to create a stable part to be handled and with a notch formed in situ in a side face; heating the green compact sufficiently to bond the metal particles together to form a strong sintered preform with the notch therein; forging the sintered preform to form a one-piece rod characterized by great density and strength while simultaneously folding the spaced, notch defining surfaces inward toward one another to produce a stress riser crease in the side thrust face of the rod; positioning the rod so that the creases lie adjacent a crack inducing force apparatus to impose a tension force across the crease, whereby the maximum stress imparted to the rod blank by the tension force is applied along the crease.

3. The connecting rod blank as set forth in either claim 1 or 2 in which the depth of the V-shaped notch is variable in a radial direction from the aperture outward to the edge whereby hot forging the variable depth notch produces a crease with a substantially constant depth as measured from and inclined side thrust face.

* * * * *